No. 704,349. Patented July 8, 1902.
E. LECONTE & J. LOISELET.
PROCESS OF MANUFACTURING RICE STARCH OR OTHER AMYLACEOUS SUBSTANCES.
(Application filed Mar. 15, 1901.)
(No Model.)
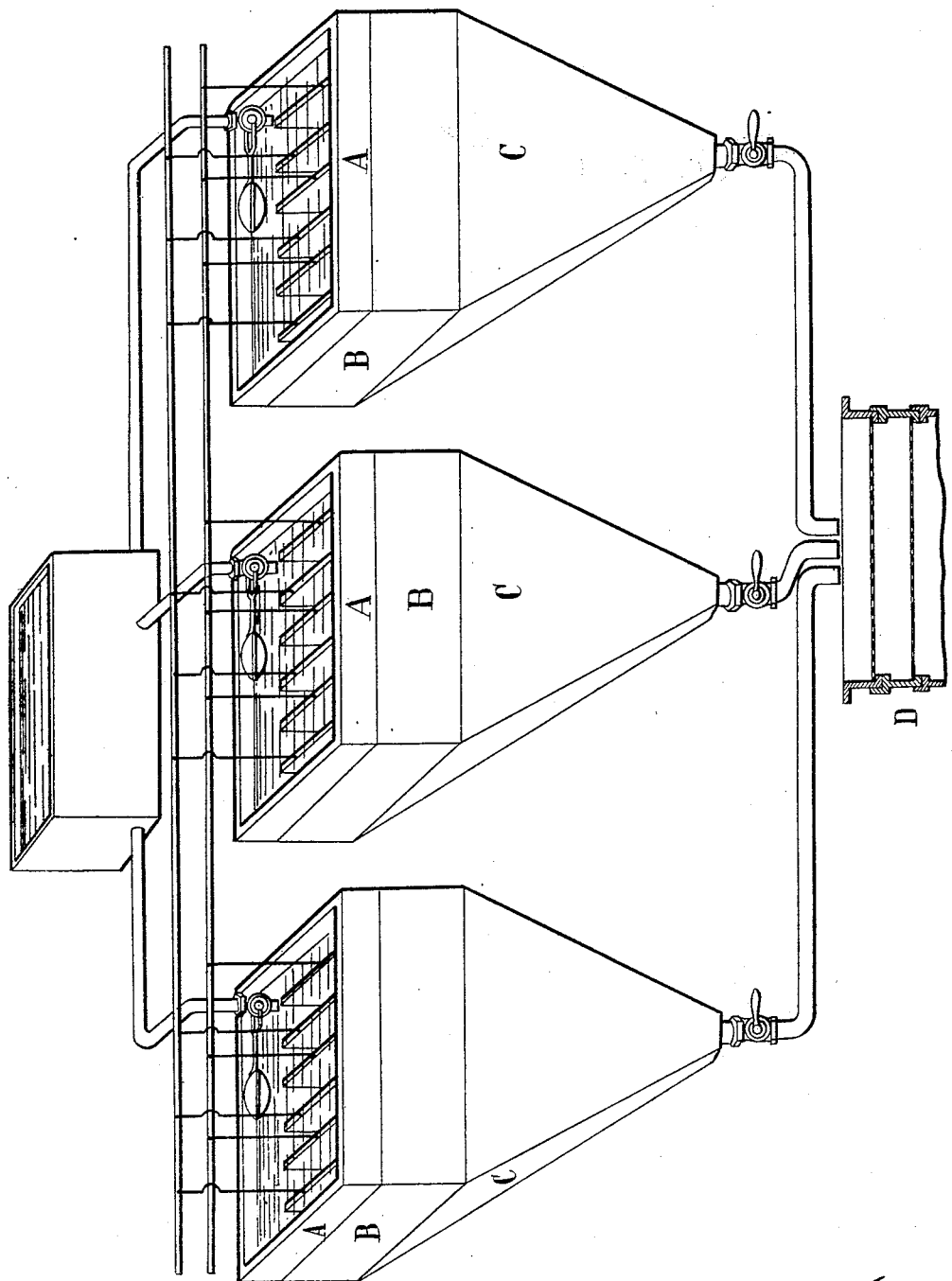
Witnesses:
Inventors:
Eugène Leconte
Jérôme Loiselet.
By James L. Norris
Atty.

UNITED STATES PATENT OFFICE.

EUGÈNE LECONTE, OF ESTAIRES, AND JÉRÔME LOISELET, OF PARIS, FRANCE.

PROCESS OF MANUFACTURING RICE-STARCH OR OTHER AMYLACEOUS SUBSTANCES.

SPECIFICATION forming part of Letters Patent No. 704,349, dated July 8, 1902.

Application filed March 15, 1901. Serial No. 51,320. (No specimens.)

*To all whom it may concern:*

Be it known that we, EUGÈNE LECONTE, engineer, residing at Estaires, Nord, France, (whose post-office address is Estaires, Nord,) and JÉRÔME LOISELET, engineer, residing at Paris, France, (whose post-office address is 123 Boulevard de la Gare,) have invented certain new and useful Improvements in Processes of Manufacturing Rice-Starch or other Amylaceous Substances, of which the following is a specification.

This invention has for its object improvements in the process of manufacturing rice-starch and other amylaceous substances.

The process according to this invention we will describe with reference to the manufacture of starch from rice, it being understood, however, that it is applicable to amylaceous substances generally. The rice may be broken or whole; but it always must be quite clean and free from dust.

In the practice of this process steeping-vats of any suitable kind are used, provided they permit of the spent liquid being removed in a complete and rapid manner, so as to facilitate the numerous subsequent washings to which the material is further subjected.

We first prepare a solution of caustic soda having a specific gravity of 0.005 to 0.0055 (Baumé's areometer) and the rice is placed therein and left therein for a time—say from thirteen to eighteen hours for broken rice and from nineteen to twenty-two hours for whole rice. Afterward the spent soda solution is removed and while it is running out another solution of caustic soda is prepared, having a density of 0.002, and this is run onto the rice after closing the emptying-cock. This solution is allowed to act for a time—say for about four hours—and it is then removed as before, and while it is running out a third solution of caustic soda is prepared, having a density of 0.001, which is run onto the rice after closing the emptying-cock. This solution is allowed to act for, say, about three hours and then it is run out. When this third solution of caustic soda has been run out, the emptying-cock is half closed and the rice-vat is filled with pure water; but the emptying-cock is not completely closed until the rice is covered with pure water. This is done for the purpose that the impurities, such as gluten and the like, (which have a tendency to precipitate,) can be removed while the rice-vat is filling with pure water. After the emptying-cock is closed the pure water is allowed to remain in the vat for, say, about three hours, so as to enable the rice to yield up soda and gluten. After this time of three hours the water is completely removed and the emptying-cock half closed and pure water allowed to flow in and fill the vat as before. The emptying-cock is then closed and the water allowed to remain for, say, about three hours. The washing with pure water is repeated four or five or more times, if necessary. After these washings the soda, gluten, and other impurities which the rice contained are in great measure removed. When the washing is completed, the well-drained rice is placed in water-tight tubs and subjected to a grinding operation. The rice may be fed, with its water, to the grinding-wheel by means of a lifting and force pump connected by piping with the bottoms of the steeping-vats, the to-and-fro motion caused by the stroke of the piston washing the rice completely. Care should be taken to let the rice fall, with the water, into a vat filled with pure water, this vat being provided with an emptying-cock, which is left open, so that as much water flows out as flows into the vat. The water issuing from this emptying-cock is charged with gluten and other impurities, but contains also a slight proportion of starch, and in order not to lose this the said water is caused to flow into a special reservoir. When the rice has been drained completely, it is taken to the grinding operation, which is facilitated by means of a jet of water. It is essential that the grinding be well done, so as to leave no grit and insure a maximum speed. The pasty mass leaving the grinding-mill is diluted to from 4° to 6° Baumé and is cribbled, and there is then added to it a solution of caustic soda or sodium carbonate to bring the alkalinity of the starch-milk to about one gram of soda per liter. This addition of soda has for its object to attach the remaining gluten and at the same time to promote the electrical conductibility in the second part of the process. After the starch-milk has been in this solution for an hour or more it is taken to electrolyzers. These apparatus, which are only described as for an example with reference to the accompanying drawing and which are disclosed from the claim, comprise a part A, in which the matter to be electrolyzed is kept at a constant level, as at B. This part A, which is of non-conducting material, such as wood or india-rubber, contains the electrodes of aluminium, zinc, or any other suitable matter. These electrodes are constituted by plates running parallel to each other and to opposite sides of the part A. Their planes are vertical, so as to facilitate the downward flow of the mass. Below there is a hopper-shaped part C, having the form of an inverted frustum or pyramid and provided at its narrower end with a cock. The connections of the electrodes are made in such a manner that alternate ones are connected separately to a bar connected with one pole of the electric generator, while the intermediate electrodes are connected to a bar connected with the other pole of the generator, which is an alternate-current dynamo. The mass to be treated flows into a mixing device situated above the electrolyzers and is supplied thereto by means of a ball-cock, so that the level remains practically constant and at a small distance above the electrodes. The mass to be treated descends slowly between the electrodes and reaches the lower hopper C, which it leaves through a regulating-cock and flows into very fine sieves D, on which it leaves the organic precipitate formed by the action of the currents. The starch is then allowed to collect on inclined surfaces.

The starch obtained by the improved process described is pure or practically pure, perfectly aseptic, and of a remarkable whiteness, which qualities are due to the electrolytic treatment.

The aforesaid electrolytic process is applicable to the manufacture of fecula from potatoes, of starch from rice, maize, and other amylaceous products, and also to the separation by electrolysis of the said starches and fecula from the gluten, nitrogenous substances, and fatty matters, which has hitherto been effected by successive washings, deposits, cribblings, and hydroextraction.

Having now particularly described and ascertained the nature of our invention and in what manner the same may be performed, we declare what we claim is—

The process of manufacturing starch, which consists in treating the starchy substances with successive alkaline solutions of decreasing strength and in washing and milling the same, and finally subjecting the mass to the action of an alternating electric current while in an alkaline solution.

In testimony whereof we have hereunto set our hands in presence of two subscribing witnesses.

EUGÈNE LECONTE.
JÉRÔME LOISELET.

Witnesses as to Eugène Leconte:
G. ACHTEN,
C. LA CROIX.

Witnesses as to Jérôme Loiselet:
EMILE KLOTZ,
EDWARD P. MACLEAN.